(12) United States Patent
Alloin et al.

(10) Patent No.: US 8,286,407 B2
(45) Date of Patent: Oct. 16, 2012

(54) COATED POLYAMIDE FILM FOR BAGGING PRODUCTS WITH EXTENDED SHELF LIFE

(75) Inventors: Florence Alloin, Villeurbanne (FR); Denis Januel, Lyons (FR); Nathalie Simon, Brindas (FR); Bruno Tetart, Craponne (FR)

(73) Assignee: Biomerieux, Marcy l'Etoile (FR)

( * ) Notice: Subject to any disclaimer, the term of this patent is extended or adjusted under 35 U.S.C. 154(b) by 366 days.

(21) Appl. No.: 12/449,006

(22) PCT Filed: Feb. 26, 2008

(86) PCT No.: PCT/FR2008/050321
§ 371 (c)(1),
(2), (4) Date: Jul. 20, 2009

(87) PCT Pub. No.: WO2008/125763
PCT Pub. Date: Oct. 23, 2008

(65) Prior Publication Data
US 2010/0011708 A1    Jan. 21, 2010

(30) Foreign Application Priority Data
Feb. 27, 2007   (FR) .................................. 07 53544

(51) Int. Cl.
*B65B 55/04* (2006.01)
(52) U.S. Cl. .......................................... 53/426; 53/403
(58) Field of Classification Search .................. 53/426, 53/403, 79, 85, 86, 425
See application file for complete search history.

(56) References Cited

U.S. PATENT DOCUMENTS

| | | | | | |
|---|---|---|---|---|---|
| 3,383,831 | A | * | 5/1968 | Goldsmith et al. | 53/167 |
| 4,104,024 | A | * | 8/1978 | Vogele et al. | 422/37 |
| 4,225,556 | A | * | 9/1980 | Lothman et al. | 422/28 |
| 4,274,210 | A | * | 6/1981 | Stengard | 34/641 |
| 4,707,334 | A | * | 11/1987 | Gerhard | 422/28 |
| 5,114,671 | A | * | 5/1992 | Olanders | 422/28 |
| 7,434,372 | B2 | * | 10/2008 | Vanhamel et al. | 53/425 |
| 7,533,512 | B2 | * | 5/2009 | Levati et al. | 53/167 |
| 7,784,249 | B2 | * | 8/2010 | Lindblad et al. | 53/426 |

FOREIGN PATENT DOCUMENTS

| | | |
|---|---|---|
| DE | 1 022 757 | 1/1958 |
| EP | 0 062 800 A1 | 10/1982 |
| EP | 0 087 031 A2 | 8/1983 |
| FR | 1.314.025 | 1/1963 |
| FR | 1.386.921 | 1/1965 |
| GB | 917233 | 1/1963 |
| GB | 1310933 | 3/1973 |
| JP | A-49-18632 | 5/1974 |

* cited by examiner

*Primary Examiner* — Sameh H. Tawfik
(74) *Attorney, Agent, or Firm* — Oliff & Berridge, PLC

(57) ABSTRACT

The present invention relates to a single-layer polymer film, intended to be used for packaging articles having an extended shelf life, said film being composed of a cast polyamide sheet, covered, on one of its faces, with a heat-sealable coating, comprising polyvinyl chloride (PVC) and/or polyvinylidene chloride (PVDC), so that said film has an average permeability between 35 g/m²/24 hours and 110 g/m²/24 hours. It also relates to a process for producing said film. It additionally relates to a pouch obtained from said film, said pouch being particularly suitable for packaging articles having an extended shelf life, especially microorganism culture media in dishes.

7 Claims, 1 Drawing Sheet

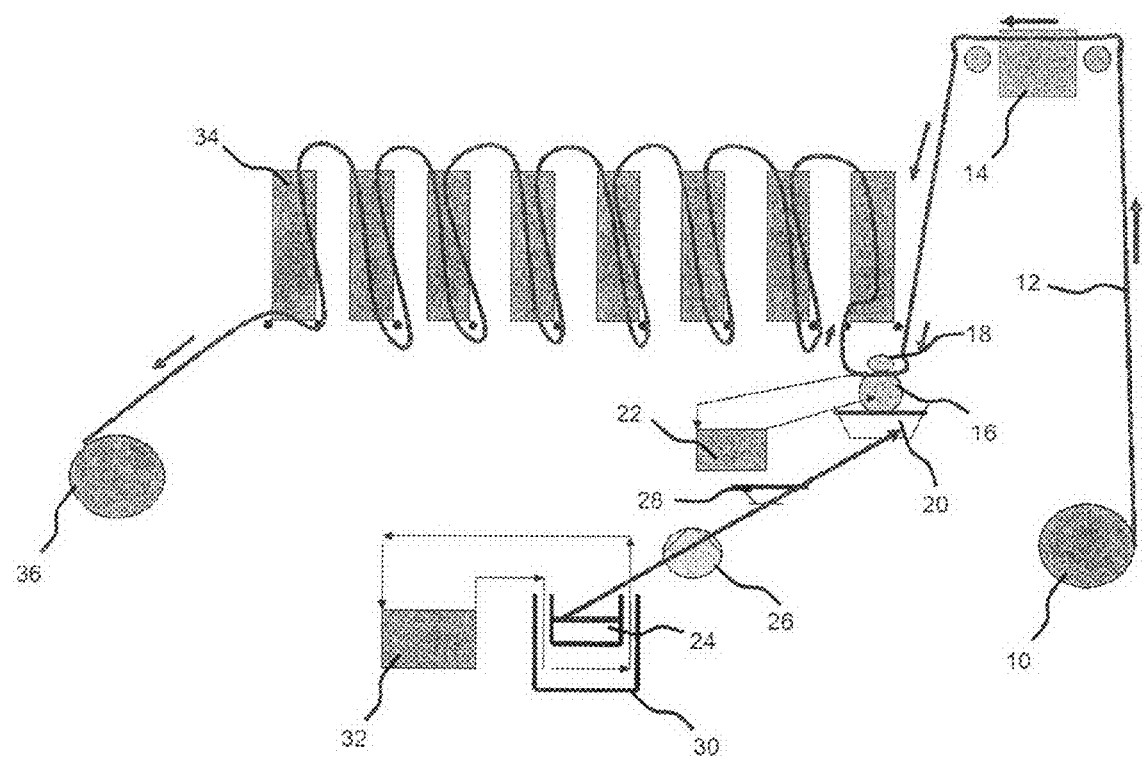

COATED POLYAMIDE FILM FOR BAGGING PRODUCTS WITH EXTENDED SHELF LIFE

CROSS-REFERENCE TO RELATED APPLICATIONS

This application claims priority to FR 0753544 filed in France on Feb. 27, 2007 and to PCT/FR2008/050321 filed on Feb. 26, 2008, the entire disclosures of which are hereby incorporated by reference in their entirety.

BACKGROUND OF THE INVENTION

The technical field of the present invention is that of materials for producing packaging. More particularly, the present invention relates to a coated film intended for packaging an article requiring an extended shelf life, of the agar culture medium type.

Many polymer films, capable of being used for packaging products, are present on the market. Mention may be made, in particular, of films for food use such as films made of polyamide (PA), polyethylene terephthalate (PET) or polyvinyl chloride (PVC). Other films such as those made of low-density polyethylene (LDPE), used for bundling (grouping together of products) or palletization, may be stretchable and shrinkable. Certain films are also composed of high-density polyethylene (HDPE) or else polypropylene (PP). Finally, in certain particular applications, the films may be composed of a complex of various polymers mentioned above.

The choice of the material to be used to produce the film depends generally on the properties that it is desired for the film to have. These properties may be of a mechanical nature, such as impact strength or creep resistance, stiffness, stretchability, tearability, flexural strength, etc. Other properties are of a physical nature, such as the capacity to transfer water (water vapor barrier, impermeability), gas transfer, ability to withstand sterilization, freezing or else being microwaved, etc. Finally, other properties may be of an esthetic nature, such as the visual appearance (transparency, gloss, etc.) or the feel.

When the interest lies more particularly in the field of in vitro diagnosis, which is the field of activity of the Applicant, and in particular in films used for bagging culture media, it is observed that the materials customarily used are materials having a low barrier property, characterized by a high water vapor permeability ($>120$ g/m$^2$×24 hours). Such a material is, for example, cellophane. This material has the advantage of allowing the water contained in ready-to-use agar culture media to evaporate and pass through the film. This then prevents too much condensation inside the bag constituted by the cellophane film. However, the main drawback is that, since water vapor passes through the film, the moisture content inside is very low, leading to greater, and therefore premature, drying of the culture medium. Therefore, the shelf life of the product is thereby affected.

Other materials also used for bagging culture media have, themselves, a high barrier property, characterized by a low water vapor permeability ($<5$ g/m$^2$×24 hours). This low water vapor permeability does not make it possible to remove the significant condensation that is formed in the dishes of ready-to-use agar media, especially after the media have been poured. It follows that this water remains in the bag until it is opened by the end user, generating splashes and soiling, which is unacceptable. Such products are for example polyolefins, such as PP or PE. Polyolefins are widely used as packaging material. However, the processes for obtaining such materials mean that the latter have very low water vapor permeability. Furthermore, materials are also found that comprise two laminated films, such as PA+PE films, intended to accentuate their water vapor barrier property. Thus materials of this type have water vapor permeability values below about ten grams/m$^2$×24 hours.

Document EP-0 062 800 describes a polyamide film, optionally covered on one of its faces with a polyvinylidene chloride resin. The polyamide used is a biaxially-oriented Nylon-6/Nylon-6,6 copolymer. This type of polymer enables the film thus obtained to have shrinkability properties. It is thus used for packaging food products.

Although this film may have properties suitable for the packaging of foodstuffs, it does not have the properties expected in the field of in vitro diagnosis for the packaging of culture media. This is because, on the one hand, the shrinkability properties are not desired and, on the other hand, the film as described does not display particular water vapor permeability values in line with expectations.

Document FR-1.386.921 describes compositions based on vinylidene chloride for coating various supports. In particular, in example 9, it describes a vinyl chloride/vinylidene chloride copolymer used to coat a polyamide film on one if its faces.

The film thus obtained has an excessively low water vapor permeability value. In other words, this film is almost impermeable. Such a film is therefore absolutely not suitable for use for the packaging of ready-to-use agar media, for the reasons stated above.

The same problem is faced with the polyamide films described in document FR-1.314.025 or else in document GB-1 310 933.

SUMMARY

It follows that the companies that produce agar culture media are still waiting for a packaging that is capable of storing said culture media under optimum conditions, namely in an environment that is sufficiently rich in water vapor to prevent their premature drying, but also that is sufficiently depleted to prevent too much condensation in the bag. These properties must furthermore be combined with a visual appearance that conforms to customer expectations, especially in terms of transparency.

It is to the credit of the inventors that they have demonstrated that it was possible to use, for the purposes of packaging articles having an extended shelf life, on the one hand, a single-layer film solely composed of unoriented PA, of the "cast" type and, on the other hand, to make PVC and/or PVDC, used as a base constituent of the coating for sealing the film, act as a modulator of the water vapor permeability, by varying the amount of coating deposited on the PA film.

DETAILED DESCRIPTION

A first objective of the present invention is therefore to provide a film in a material that possesses physical properties, particularly in terms of water vapor barrier capacity, capable of enabling an improved shelf life of the products needing to be stored for an extended time in an atmosphere having a controlled moisture content.

A second objective of the present invention is to provide a film that can be produced easily from a material that is widely used in the packaging field and that furthermore has a limited production cost.

A third objective of the present invention is to provide a single-layer material that is flexible and has a small thickness.

A fourth objective of the present invention is to provide an easily sealable material.

A fifth objective of the present invention is to provide a material capable of meeting the standards in terms of esthetic appearance, particularly in terms of transparency and of feel.

These objectives, among others, are achieved by the present invention which relates firstly to a single-layer polymer film, intended to be used for packaging articles having an extended shelf life, said film being composed of a cast polyamide sheet, covered, on one of its faces, with a heat-sealing coating, so that said film has an average water vapor permeability between 35 g/m$^2$/24 hours and 10 g/m$^2$/24 hours.

The term "film" is understood to mean a layer of polyamide, with no size limitation, covered with the heat-sealing coating.

The term "sheet" is understood to mean a layer of polyamide, with no size limitation, not yet covered with the heat-sealing coating.

The expression "cast polyamide" is understood to mean an unoriented polyamide, obtained by extrusion through a sheet die. Such a polyamide may be, for example, that sold by CFP Flexible packaging S.p.A., under the reference FILMON® CS.

It should be noted that the water vapor permeability values described in the present application have been obtained by measuring according to the ISO 2528:1995 standard, namely at a temperature of 38° C. and a relative humidity of 90%.

According to one preferred embodiment of the invention, the heat-sealing coating comprises polyvinyl chloride (PVC), polyvinylidene chloride (PVDC), or blends thereof.

Advantageously, the amount of coating deposited on the polyamide sheet is between 0.8 and 10 g/m$^2$ of polyamide sheet.

More advantageously still, the amount of coating deposited on the polyamide sheet is between 2 and 3 g/m$^2$ of polyamide sheet.

According to another preferred feature, the layer of polyamide has a thickness between 15 and 100 μm.

The polyamide is preferably taken from the group of PA-6 polyamides.

Another subject of the present invention relates to the use of a film as described above for packaging at least one article having an extended shelf life.

Preferably, the article is a microorganism culture medium in a dish.

Another subject of the present invention relates to a pouch, intended for packaging at least one article having an extended shelf life, at least one of the walls of which is composed of a polymer film as described above.

Another subject of the present invention relates to a process for producing a coated single-layer polymer film as described above, comprising the steps consisting in:
 obtaining a sheet of polyamide; and
 depositing a coating comprising polyvinyl chloride (PVC) and/or polyvinylidene chloride (PVDC) on said sheet, so that the amount of said coating is between 0.8 and 10 g/m$^2$ of polyamide sheet.

According to one advantageous variant of the process for producing the film, the polyamide sheet is obtained by extrusion through a sheet die without orientation.

The coating may be deposited on the polyamide sheet by gravure printing.

Another subject of the present invention relates to a process for producing a pouch as described above, comprising the steps consisting in:
 superposing two polymer films according to the invention, so that the faces bearing the coating are opposite one another;
 fastening the edge of said films, over at least 50% of their periphery.

According to one alternative, the process for producing a pouch as described above comprises the steps consisting in:
 folding said film in two, so that the superposed edges of said film are in the vicinity of one another, the faces bearing the coating being opposite one another;
 fastening, at least partially, two superposed edges along at least one side of said film, so as to obtain a pouch comprising an opening along at least one of its edges.

Preferably, the fastening step is carried out by heat sealing at a temperature between 100 and 170° C.

Another subject of the present invention relates to a process for packaging at least one article having an extended shelf life, comprising the steps consisting in:
 placing the article on a film according to the invention, on the face bearing the coating;
 covering said article with a portion of said film that has remained free or with another film, so that the faces bearing the coating are opposite one another;
 fastening the edges of the film or of the two films, so that the article is trapped in the pouch thus formed.

Preferably, the article is a microorganism culture medium.

According to one advantageous variant of the invention, the film or films are sterilized beforehand. The sterilization method is an irradiation by rays, in particular gamma or beta rays, or any equivalent sterilization process.

According to one preferred embodiment, the step of fastening the edges of the sheet(s) is carried out by heat sealing at a temperature between 100 and 170° C.

According to one advantageous variant of the invention, the packaging process also comprises the additional steps consisting in:
 placing the pouch thus obtained inside a second pouch; and
 sealing said second pouch.

According to another advantageous variant, the packaging process also comprises the additional steps consisting in:
 placing the second pouch thus obtained inside a third pouch; and
 sealing said third pouch.

Preferably, said second and/or third pouches are composed of a material taken from the group comprising: cellophane, polyolefins and polyamides.

According to one advantageous variant, said second and/or third pouches are composed of a film according to the invention.

A final subject of the present invention relates to the use of a pouch according to the invention for producing a diagnostic kit comprising at least one microorganism culture medium contained in at least one pouch as described above.

EXAMPLES

The objectives and advantages of the present invention will be better understood in light of the following, in no way limiting, examples with reference to FIG. 1, which represents a diagram that illustrates the device that makes it possible to implement the process for coating the polyamide film.

Example 1

Composition and Production of a PVDC Coating

1/ Composition:

An example of the composition of a coating deposited on the polyamide film is the following:
DIOFAN® AO36 PVDC latex from Solvin
Commercial demineralized water
SIPERNAT FK310 4μ diameter silica from Degussa Ltd.
MICHEMLUBE 160 wax from Michelman USA
Cast PA from CFP Italy 2/ Preparation:

In readiness for the coating phase, it is necessary to dilute the PVDC latex in order to adjust the deposition. This adjustment is carried out using demineralized water.

PVDC Latex Dilution:

Mixing is carried out in the following manner:

| Amount of PVDC latex to dilute | kg | A | 100 kg |
|---|---|---|---|
| Solids content of PVDC latex | % | B | 55% |
| Dilution | % | C | 30% |
| Amount of water to add to the PVDC latex | kg water | D | 83.33 kg |

Preparation and Incorporation of the Silica:

The silica must be diluted in demineralized water, which must also serve as a diluent for the PVDC latex.

The components must be mixed with a high speed agitator at 6000 rpm, for 5 min.

Next, the solution may be added to the PVDC latex, slowly.

Calculation of the amount of silica:

| Silica solids content | % wet | A | 100% |
|---|---|---|---|
| PVDC latex solids content | % wet | B | 51% |
| Formula | g silica/kg dry PVDC latex | C | 5 g/kg |
| Amount of PVDC latex | kg PVDC latex | D | 100 kg |
| Amount of silica | g silica | E | 255 g |

Preparation and Incorporation of the Wax

The wax is introduced directly into the PVDC latex. It is important to keep to the amounts determined, so as not to deteriorate the permeability to gases, the sliding coefficient, and also the sealing properties.

Calculation of the amount of wax:

| Wax solids content | % wet | A | 25% |
|---|---|---|---|
| PVDC latex solids content | % wet | B | 51% |
| Formula | g dry wax/kg dry PVDC latex | C | 5 g/kg |
| Amount of PVDC latex | kg PVDC latex | D | 100 kg |
| Amount of wax | g wax | E | 1020 g |

Example 2

Process for Coating the Polyamide Film

Represented in FIG. 1 are the various steps of the process for coating the polyamide.

The polyamide sold by CFP under the trade name FIL-MON® CS is in the form of a reel 10 composed of a wound strip of polyamide, the width of which is 1200 mm.

The polyamide strip 12 is unwound and joins up with a station 14 at which it undergoes a corona treatment. Well known to a person skilled in the art, corona treatment makes it possible to increase the surface tension of polymer materials, before these materials are printed, bonded or coated. This surface treatment enables better adhesion of the PVDC coating to the polyamide. This treatment is advantageously of 38 dyn.

Once the corona treatment is completed, the polyamide strip joins up with the coating station. At this stage, the polyamide strip is coated, by gravure printing, by passing between two rolls, the coating roll 16 and the press roll 18. The coating roll 16 is an etched roll. It is loaded with coating by dipping in a tank 20 containing the coating, the latter being deposited in the infractuosities obtained by etching. The surplus coating is then scraped off by means of stainless steel blades. When the part of the roll 16 loaded with coating comes into contact with the polyamide strip, the coating is deposited on the latter. The coating rolls are cooled by means of a coolant fluid circuit that is connected to a cooling box 22. Thus, the temperature of the rolls is maintained between 15 and 20° C.

The dip tank 20 is supplied with the coating by means of a supply circuit. The coating is drawn from a reservoir 24 and is transported to the dip tank 20 by means of a pump 26. Before reaching the dip tank 20, the coating is filtered using a filter 28, that makes it possible to eliminate any impurities.

The reservoir 24 is placed in a container 30, capable of enabling it to be cooled. In order to do this, the container 30 is connected to a cooling box 32 by means of a coolant fluid circuit.

The amount of coating deposited on the polyamide is thus between 2 and 3 $g/m^2$, depending on the desired degree of water vapor permeability.

Once the polyamide is coated, the strip joins up with hot boxes 34 that enable the coating to be dried. For this purpose, the polyamide strip passes through various boxes, the internal temperature of which varies between 140 and 160° C. Passing through these boxes makes it possible to evacuate the water from the wet deposition on the polyamide.

Advantageously, the strip is cooled using cooling rolls (not represented) at the entry to and exit from the hot boxes.

After drying, the coated polyamide strip is wound onto a reel 36, using a winder.

Example 3

Bagging of 10 Count-Tact Type Petri Dishes in Triple Wrapping Composed of One Coated Polyamide PA-6 Pouch and of Two Cellophane Pouches A culture broth corresponding to the formulation indicated below was prepared:

| Casein peptone (bovine): | 15.0 g |
|---|---|
| Soybean peptone | 5.0 g |
| Yeast extract | 6.0 g |
| Sodium chloride | 5.0 g |
| Sodium pyruvate | 2.0 g |
| Soybean lecithin | 0.7 g |
| Polysorbate 80 (Tween 80) | 5.0 g |
| Sodium thiosulfate | 0.05 g |
| L-Histidine | 1.0 g |
| Agar | 20.5 g |
| Purified water | 1000 ml |

It was steam sterilized (or sterilized by any other sterilization process compatible with the culture media) and it was poured into Count-Tact™ dishes and left to form a gel.

A stack of 10 Count-Tact™ dishes loaded with such a broth were placed in a preformed pouch (one longitudinal weld and one transverse weld) composed of the coated single-layer "cast" polyamide PA-6 film (thickness 40 μm, coating between 2 g/m² and 3 g/m²). This pouch had been first radiosterilized with gamma rays at a dose between 25 and 40 kgray. The first pouch was sealed with a heat-sealing device at a temperature of 140° C., under 1.6 bar of pressure for 1 second. The first pouch was placed inside a second pouch composed of cellophane 430 LMS (water vapor permeability of 600 g/m²/24 hours) and this pouch was sealed with a heat-sealing device at a temperature of 170° C. The second pouch was placed inside a third pouch composed of cellophane 430 LMS and was sealed with a heat-sealing device at a temperature of 170° C. The triple wrapped package was boxed and 8-12 kgray doses of gamma ray irradiation were applied to it.

The system thus described enables said culture medium to be stored at a temperature between 2 and 8° C.

Example 4

Bagging of 10 Petri Dishes of 90 mm Format in a Wrapping Composed of One Coated Polyamide PA-6 Pouch A culture broth corresponding to the formulation indicated below was prepared:

| | |
|---|---|
| Peptones (porcine or bovine): | 17.2 g |
| L-tryptophan | 0.9 g |
| HEPES buffer | 0.4 g |
| Chromogen mixture | 6.87 g |
| Agar | 18 g |
| Purified water | 1000 ml |

It was steam sterilized (or sterilized by any other sterilization process compatible with the culture media) and it was poured into 90 mm format Petri dishes (dishes having a diameter of 90 mm) and left to form a gel.

A stack of 10 dishes of 90 mm (dishes having a diameter of 90 mm) loaded with such a broth were bagged by an automatic horizontal machine in a pouch composed of a coated single-layer "cast" polyamide PA-6 film having a thickness of 40 μm and comprising a coating between 2 g/m² and 3 g/m². The sealing temperature of the pouch was 100° C. and the pouch was composed of one longitudinal weld and two transverse welds. The stacks of 10 dishes were boxed.

The package thus produced made it possible to limit the loss of water from the agars under the storage conditions customarily used, while maintaining a correct exudation rate. The results obtained with this system make it possible to envisage an increase in the storage time of 47%.

Example 5

Example 4 was reproduced, with the difference that the stack of 10 dishes loaded with the broth was bagged in a pouch composed of a coated single-layer "cast" polyamide PA-6 film having a thickness of 30 μm and comprising a coating between 1.6 g/m² and 2 g/m²).

The system thus described made it possible to limit the loss of water from the agars under the customers' storage conditions while maintaining a correct exudation rate. The results obtained with this system make it possible to envisage an increase in the storage time of 41%.

Example 5

Example 3 was reproduced, substituting the second and/or the third pouch (cellophane 430 LMS) with a preformed pouch made of a coated single-layer polyamide film, as described previously, first radiosterilized with gamma rays at a dose of 25-40 kgray (thickness 40 μm, coating between 2 g/m² and 3 g/m²).

Example 6

Example 1 was reproduced, substituting the first and/or the second and/or the third bag with a preformed pouch made of a coated single-layer polyamide film, as described previously, first radiosterilized with gamma rays at a dose of 25-40 kgray (thickness 30 μm, coating between 1.6 g/m² and 2 g/m²).

Example 7

A culture broth corresponding to the formulation indicated below was prepared:

| | |
|---|---|
| Casein peptone | 15.0 g |
| Soybean peptone | 5.0 g |
| Sodium chloride | 5.0 g |
| Agar | 15 g |
| Purified water | 1000 ml |

It was steam sterilized (or sterilized by any other sterilization process compatible with the culture media) and it was poured into 90 mm dishes and left to form a gel.

A stack of 10 dishes of 90 mm loaded with such a broth were bagged by an automatic horizontal machine in a bag composed of a coated single-layer film (thickness 30 μm, coating between 1.6 g/m² and 2 g/m²). The first pouch was bagged by an automatic horizontal machine inside a second pouch composed of cellophane 430 LMS (water vapor permeability of 600 g/m²/24 hours). The second pouch was bagged by an automatic horizontal machine inside a third pouch composed of cellophane 430 LMS. The triple wrapped package was boxed and 8-12 kgray doses of gamma ray irradiation were applied to it.

The invention claimed is:

1. A single-layer polymer film for packaging articles having an extended shelf life, comprising a cast polyamide sheet covered on at least one face with a heat-sealing coating, said film having an average water vapor permeability between 35 g/m²/24 hours and 110 g/m²/24 hours.

2. The polymer film as claimed in claim 1, wherein the heat-sealing coating comprises polyvinyl chloride (PVC), polyvinylidene chloride (PVDC), or blends thereof.

3. The polymer film as claimed in claim 1, wherein the coating comprises PVDC, a silica and an anionic wax emulsion.

4. The polymer film as claimed in claim 1, wherein the amount of coating deposited on the polyamide sheet is between 0.8 and 10 g/m² of polyamide sheet.

5. The polymer film as claimed in claim 1, wherein the layer of polyamide has a thickness between 15 and 100 μm.

6. The polymer film as claimed in claim 1, wherein the polyamide is a PA-6 polyamide.

7. A pouch for packaging at least one article having an extended shelf life, said pouch having at least one wall of a film as claimed in claim 1.

* * * * *